United States Patent
Zhu

(10) Patent No.: US 12,028,182 B2
(45) Date of Patent: Jul. 2, 2024

(54) SMART HOME SYSTEM AND PRODUCT THEREOF

(71) Applicant: Baodong Zhu, Beijing (CN)

(72) Inventor: Baodong Zhu, Beijing (CN)

( * ) Notice: Subject to any disclaimer, the term of this patent is extended or adjusted under 35 U.S.C. 154(b) by 0 days.

(21) Appl. No.: 17/751,626

(22) Filed: May 23, 2022

(65) Prior Publication Data

US 2022/0286316 A1 Sep. 8, 2022

Related U.S. Application Data

(63) Continuation-in-part of application No. 15/719,845, filed on Sep. 29, 2017, now abandoned, and a continuation of application No. PCT/CN2016/079526, filed on Apr. 17, 2016.

(30) Foreign Application Priority Data

Mar. 29, 2015 (CN) .......................... 201510139473.4

(51) Int. Cl.
| | |
|---|---|
| *H04L 12/28* | (2006.01) |
| *G06N 20/00* | (2019.01) |
| *G16Y 10/80* | (2020.01) |
| *G16Y 40/35* | (2020.01) |
| *H04W 4/80* | (2018.01) |

(52) U.S. Cl.
CPC ........... *H04L 12/282* (2013.01); *G06N 20/00* (2019.01); *G16Y 10/80* (2020.01); *G16Y 40/35* (2020.01); *H04L 12/2829* (2013.01); *H04W 4/80* (2018.02); *H04L 2012/2841* (2013.01)

(58) Field of Classification Search
None
See application file for complete search history.

(56) References Cited

U.S. PATENT DOCUMENTS

| | | | |
|---|---|---|---|
| 2012/0245752 A1* | 9/2012 | Borrett ................... | G06Q 10/06 700/295 |
| 2014/0128032 A1* | 5/2014 | Muthukumar .... | H04W 52/0254 455/412.2 |
| 2016/0249286 A1* | 8/2016 | Chen ..................... | H04W 48/20 |

* cited by examiner

*Primary Examiner* — Sean Shechtman
(74) *Attorney, Agent, or Firm* — DINSMORE & SHOHL LLP

(57) ABSTRACT

A smart home system and a product thereof, comprising two types of smart home products and a method for building and operating a smart home system. One type of product is a central control unit serving as the core of the smart home system, and the other type is a human-computer interaction product. The smart home system is composed of a central control unit, human-computer interaction products and other various home products. The central control unit serves as a monitor with respect to various home products and monitors the running of the home products, and serves as a server with respect to the human-computer interaction products, the human-computer interaction products are clients with respect to the central control unit, and the control unit receives service requests of the human-computer interaction products and returns request results thereof, and can actively contact them to acquire various items of data.

14 Claims, 4 Drawing Sheets

SMART HOME SYSTEM AND PRODUCT THEREOF

CROSS-REFERENCE TO RELATED APPLICATIONS

This application is a continuation-in-part application of U.S. patent application Ser. No. 15719845, which is a continuation of International Patent Application No. PCT/CN2016/079526 with an international filing date of Apr. 17, 2016, and further claims priority benefits to Chinese Patent Applications 201510139473.4, filed Mar. 29, 2015. The contents of all of the aforementioned applications, including any intervening amendments thereto, are incorporated herein by reference.

FIELD OF THE INVENTION

The present invention relates to the technical field of Internet of Things (IOT), and more specifically, to a smart home.

BACKGROUND OF THE INVENTION

The smart home, based on the IOT technology, aims at achieving household automation and intelligence and constantly meeting and promoting all people's needs. The concept has been put forward for some years and now there are a few so-called smart home products. Such products fall into two types: one is product-level, that is, some manufacturers developed a product that may be controlled by mobile APP, which is essentially the same with the control by a remote control. It may be useful if the product is remotely monitored and controlled. However, it is a stupid method to complicate the simple thing at home. In addition, such products cannot operate intelligently. The other is system-level. Products controlling the air conditioning system and gas detection alarm system, such as Nest's temperature controller and Protection, are basically the same with the traditional, a little senior single-chip microcomputer control system. Running parameters are set on the control panel and then running data are visible on the panel. The above two situations can only be used to monitor and control a product or a simple system. However, the smart home products can fall into multiple types by the system and into various kinds by products. In addition to locally and remotely monitoring and controlling all appliances, the smart home products shall provide a variety of services and intelligent functions. Therefore, the above two types of products are limited in function and performance; additionally, it is more serious that these two methods are essentially control by a remote control or panel control and are an improved version. Although the latter has a learning function, the intelligence level is low. It cannot meet the people's expectation or realize the smart home. There is still a problem: the IOT uses a short-distance wireless communication technology. The current short-distance wireless communication technologies include WiFi, Bluetooth, ZigBee, Z-Work, etc. As all technologies have advantages and disadvantages and are continuously developed, it cannot be predicted that which technology dominates the smart home filed. A uniform standard is lacked. As a result, products made by different manufacturers may adopt different technologies and manufacturers have their own standards respectively. Some manufacturers are in alliance with each other. Thus, we can see the smart home products are still in a conceptual and initial stage. At present, it is impossible to locally and remotely monitor and control products made by different manufacturers, and the essence of smart home products cannot be realized. Therefore, there is no essential smart home system available in the world at present.

SUMMARY

In one aspect, the present disclosure provides a smart home system. The smart home system comprises a central controller, a device for human-machine interaction, and home products. The central controller communicates with the device for human-machine interaction and the home products in a wired or wireless manner. The central controller cooperates with the device for human-machine interaction. The central controller is arranged in a residence, and the device for human-computer interaction is arranged in a required room of the residence or arranged on the home products or is integrated with the home products. The central controller is configured to store names of the device for human-machine interaction and the home products into a database of the smart home system, and information of the room or location where the device for human-machine interaction and the home products are located is manually inputted into the database. The device for human-machine interaction is configured to send control command to the central controller, the central controller is configured to coordinate, manage or control the home products or inquiry information of the home products, or the central controller actively collects or receives information of home products, and automatically performs management and control after analysis and processing. For a situation where there is only one home product of a type in the residence, the central controller allows the device for human-machine interaction to monitor the home product beyond the room or position of the device for human-machine interaction; for a situation where home products of a type are distributed in two or more rooms or locations, a control range of the device for human-machine interaction defaulted by the central controller is the home product in the room or location where the device for human-machine interaction is located, and a monitoring range of the device for human-machine interaction is not limited; for a situation where a home product of the same type in other rooms or locations need to be controlled, the device for human-machine interaction needs to indicate where the home product of the same type is located when communicating with the central controller; and for a situation in which there are two or more home products of the type in a same room or location, the device for human-machine interaction needs to indicate a name of the home product to be monitored by the device for human-machine interaction when communicating with the central controller.

In another aspect, the present disclosure disclose a method for establishing a smart home system, where the smart home system comprises a central controller, a device for human-machine interaction, and home products, where the central controller communicates with the device for human-machine interaction and the home products in a wired or wireless manner; the central controller cooperates with the device for human-machine interaction; the central controller is arranged in a residence, and the device for human-computer interaction is arranged in a room of the residence or arranged on the home products or is integrated with the home products. The method comprises: after arranging the home products and the device for human-machine interaction in place, powering the home products and the device for human-machine on to run and establishing connection with the central controller, adding the home products and the device for human-machine into a database of the smart home system, manually inputting a name of a room or a position where the device for human-machine is located into the database, and manually inputting a name of a room or a position where each home product is located into the database; if there are two or more identical home products in the room or the position, giving different names to the home products after manual inputting the room or the position.

In another aspect, the present disclosure discloses a method for running a smart home system. The smart home system comprise a central controller, a device for human-machine interaction, and home products, where the central controller communicates with the device for human-machine interaction and the home products in a wired or wireless manner; the central controller cooperates with the device for human-machine interaction; the central controller is arranged in a residence, and the device for human-computer interaction is arranged in a room of the residence or arranged on the home products or is integrated with the home products. The method comprises: in automatic operation of the smart home system or without temporary intervention by a user, the central controller running according to a preset logic or a logic formed by addition or changing of the logic by users, playing a role of overall coordination to control the smart home system; a monitoring program of the central controller performing roll polling on all home products, collecting condition data of all home products, storing the collected condition data into a database and generating a work report; if a home product alarm occurs, the monitoring program taking priority over saving an alarm message into an alarm report of the database, and recording events that are self-processed after the home product responding to alarm or processed after the central controller responding to alarm into the database, and the generated report being used for users query; the monitoring program of the central controller analyzing and processing the collected data, and outputting a command to control home products associated with the collected data, and control being changed according to user command from the device for human-machine interaction; and the monitoring program of the central controller responding query and control processing requests from authorized external terminals, or sending relevant information to cloud after authorization.

In other aspects, the present invention provides a smart home system solution which comprises two smart home products and system working methods. The solution aims at making the smart home truly smart, and enabling people to control various home products at will, including smart and non-smart physical products, outdoor products such as vehicles and garden products, and enjoy various services provided by these smart products, allowing people and home products to interact naturally, smoothly and harmoniously like the interaction between people. These two smart home products are like true people and become indispensable in the family.

These two products are: one is the central control unit or cerebral nerve center (with artificial intelligence), called the housekeeper; the other is the tool or five sense organs for human-machine interaction, called servant or servant girl. The working method of the system is the establishment, operation, monitoring and management of the system.

A set of complete smart home system is composed of a housekeeper and all products, wherein the housekeeper is the most important artificial intelligence part and management control part, all smart products belong to functional part (execution or detection), and servant/servant girl is the important human-machine interaction part (can also have monitoring and execution functions). The housekeeper is in the core status in the smart home system. He (she) can be interconnected with other products to collect or receive the information of other products, monitor or control the operation of other products, receive the input of servant/servant girl, transmit all kinds of data to servant/servant girl, and contact with the local or remote terminal and cloud. Generally, the housekeeper may be placed in the living room, or other places, but it shall be connected with the Internet conveniently; servant/servant girl is placed in a required room or position (or on other products, or integrated with other products as a product) and users can conduct human-machine interaction with the housekeeper by him (her) anywhere and anytime. Servant/servant girl placed in the entrance may be called as doorman.

I. Housekeeper

The housekeeper hardware comprises the following units: a processing unit, a storage unit, a communication unit and a power supply unit, wherein the communication unit comprises WiFi and all other units are connected with the processing unit; it may also comprise a display unit and an audio unit; the communication unit may also comprise one or several of the short-distance communication modules such as Bluetooth, ZigBee and Z-Wave, comprise a routing unit, an Ethernet module, a power line communication module, and comprise one or several of long-distance communication modules such as 3G and 4G; the audio unit may also comprise one or several of a loudspeaker, microphone and line output terminal (interface).

The processing unit, as the core of the housekeeper, processes data transmitted from all home products, and sends the corresponding commands to all relevant products after the corresponding analysis and processing; it receives and processes manually inputted commands or data (including local and remote, voice and screen), and runs other programs (such as browser, video and audio program, and artificial intelligence and so on). The communication unit, as the link between the processing unit and all home products, receives data from all products, transmits them to the processor and sends data from processor to all products; meanwhile, it is the contact bridge between the housekeeper and outside (equipment or system except home products, such as smart phone, computer, cloud and Internet). With the routing function, the housekeeper can be used as a common router. The display unit is connected with the display screen and the audio unit can be connected with the line input. The storage unit is a platform for the housekeeper to run all programs and a library storing all data. The power unit provides the power to all other units. There are rich interfaces for the housekeeper, including one or several of USB, VGA, HDMI, RJ45 and cable TV interfaces.

The housekeeper software is of an open modular construction, falls into system software (including database) and application software. The application software further falls into functional software and product monitoring software (with artificial intelligence functions, supporting the third-party application software).

For the housekeeper, voice interaction takes priority over screen interaction. In the voice interaction mode, users can interact with the housekeeper via voice. The housekeeper calls a voice module in the artificial intelligence module from functional software to process the voice information, then calls monitoring software or database or all kinds of functional software according to the processing results of the voice module; in the screen interaction mode, users directly run the monitoring software or database or all kinds of functional software through the touch screen.

II. Servant/Servant Girl

Servant/servant girl comprises a processing unit, a storage unit, a communication unit, an audio unit (including microphone and loudspeaker) and a power supply unit, and may also comprise a video unit, a sensor unit and a display unit, wherein all units are connected with the processing unit; a radio antenna and cradle head may be equipped; the sensor unit may be provided with various sensors. The communication unit may achieve communication between the product and housekeeper or directly communicate with the outside; the video unit can take video images and plays a role in monitoring and video communication; the audio unit can achieve human-machine interaction between the users and housekeeper via voice interaction and also play music and radio programs; the display unit can display the required information and achieve human-machine interaction with the housekeeper or other servant/servant girl or/and outside through screen interaction, and the sensor unit can be used for security detection and detection of indoor air parameters.

III. Smart Home System

The complete system is composed of a housekeeper, servant/servant girl and home products. The housekeeper is the cerebral nerve center, servant/servant girl is five sense organs and other home products are limbs. The housekeeper works in coordination with servant/servant girl in the way of one-to-one or one-to-many. The simplified system may only comprise the housekeeper and servant/servant girl, however, without other home products, the system is like quadriplegic and lacks action capability; so many things cannot be done. The simplified system may only comprise the housekeeper and other home products, however without servant/servant girl, five sense organs are disabled, although the system can take action, but it cannot see, listen, speak or communicate with people by language and eyes; although other products may have audio and video functions, the convenience, comfort and especially experience become much worse than servant/servant girl.

All products can communicate with the housekeeper in a wireless or wired way and servant/servant girl can realize direct communication with each other. In respect of all home products, the housekeeper serves as the controller to collect or receive their information and control their running according to the preset logics or the logics formed by addition, deletion or changing of the original logics by users; the housekeeper is the artificial intelligence server and cerebral nerve center for servant/servant girl and local or remote terminal, and servant/servant girl and local and remote terminal are five sense organs and/or client (may be functional component). The housekeeper receives the service request from servant/servant girl and local or remote terminal and returns the processing results to them. The housekeeper can also actively contact with them to send or collect various data. The housekeeper may set the authorization of all servant/servant girls.

The smart home system classifies all products by different rooms (or positions) of the products and different categories of the products, and runs and controls products using a combination of a product name, a category of the product, and information of the room or location where the home product is located.

The housekeeper manufacturer and all partners for home products can set a unique ID in standard format for all home products and store the ID in the chip or/and mark the ID on the products. The ID identifies that the product is a certain type of product belonging to a certain category. The corresponding monitoring program (in case of unique control characteristic) is written for the product or the corresponding compatible monitoring module in the main monitoring program from the housekeeper manufacturer is directly used; if the own better program of the product is used, the interface is provided for the main monitoring program of the housekeeper to call; if a new product monitoring program is added, the housekeeper manufacturer will update its own main monitoring program. The main monitoring program of the housekeeper has an interface for the housekeeper's voice module to call. The main monitoring program and the monitoring programs of all products are pre-stored in the web site server of the housekeeper manufacturer for downloading.

The establishment and working ways of the smart home system are shown below: after the product(including servant/servant girl) are arranged in place, the product is powered on to run and establish the connection with the central controller, the central controller then adds the product into the database of the smart home system, and the name of the room or position where the product is located is in manually inputted into the database; if there are two or more identical products in a room or position, the housekeeper will automatically number the product, then a different name needs to be given to the product after manual inputting.

All home products run independently under normal conditions, because they have own control logics or running mode. The housekeeper mainly plays a role of overall coordination to control the system that is composed of multiple independent products; under normal condition, the system runs according to the preset logics or the logics formed by addition or changing of the original logics by users. If necessary, temporary change can be made with servant/servant girl or authorized outside products. One task of the monitoring program of the housekeeper is to auto poll all products, collect product condition data, store them into database and generate a work report. It will be interrupted in case of product alarm. The monitoring program takes priority over saving the alarm message into the alarm report of the database, and records into the database the events that are self-processed after the product responds to alarm or processed after the housekeeper responds to alarm. The generated report is used for users query or housekeeper's artificial intelligence program. Another task of the monitoring program is to analyze and process the collected data, and output the relevant command to control relevant products. Control can be changed according to artificial commands from servant/servant girl. Another task of the monitoring program is to respond to the query and control processing requests from the authorized terminals, such as mobile phone and computer or to send the relevant information to the cloud after authorization.

The system software and application software (including the third-party software) of the housekeeper can be automatically updated, and the updating events are recorded.

Servant/servant girl is arranged in the required room or position. Users can contact with the housekeeper through the product in the way of voice interaction or screen interaction anywhere and anytime, and calls the monitoring program or database program or all functional programs (including artificial intelligence module) to monitor all home products in real time, as well as inquire the relevant information, obtain the relevant data, acquire related services or get contact with other servant/servant girl or the outside through the housekeeper. Where there is only one smart home product of a type in a residence, the monitoring program of the housekeeper allows servant/servant girl to monitor the product beyond the set room or position of servant/servant girl; where some products of a type are arranged in two or more rooms or positions, the control range of servant/servant girl defaulted by the monitoring program of the housekeeper is the product in the room or position where servant/servant girl is located, and the monitoring range is not limited; when the same products in other rooms or positions needs to be controlled, it is necessary to explain the name of the room or position where the same product is located when contacting with the housekeeper; if two or more products of a type are in the same room or position, servant/servant girl needs to explain the product name to be monitored when contacting with the housekeeper.

The invention discloses two smart home core products and a set of method for achieving home automation. Two smart home products can become a member of the family like real people. Home product automation can be truly achieved with the product and method. People and home products are interacted naturally, smoothly and harmoniously like interaction between people and people; with the system, people can fully enjoy the unprecedented sense of freshness, sense of intelligence, comfort and satisfaction carried by the smart home system.

PREFERRED EMBODIMENT OF THE INVENTION

I. Housekeeper

Figure 1:
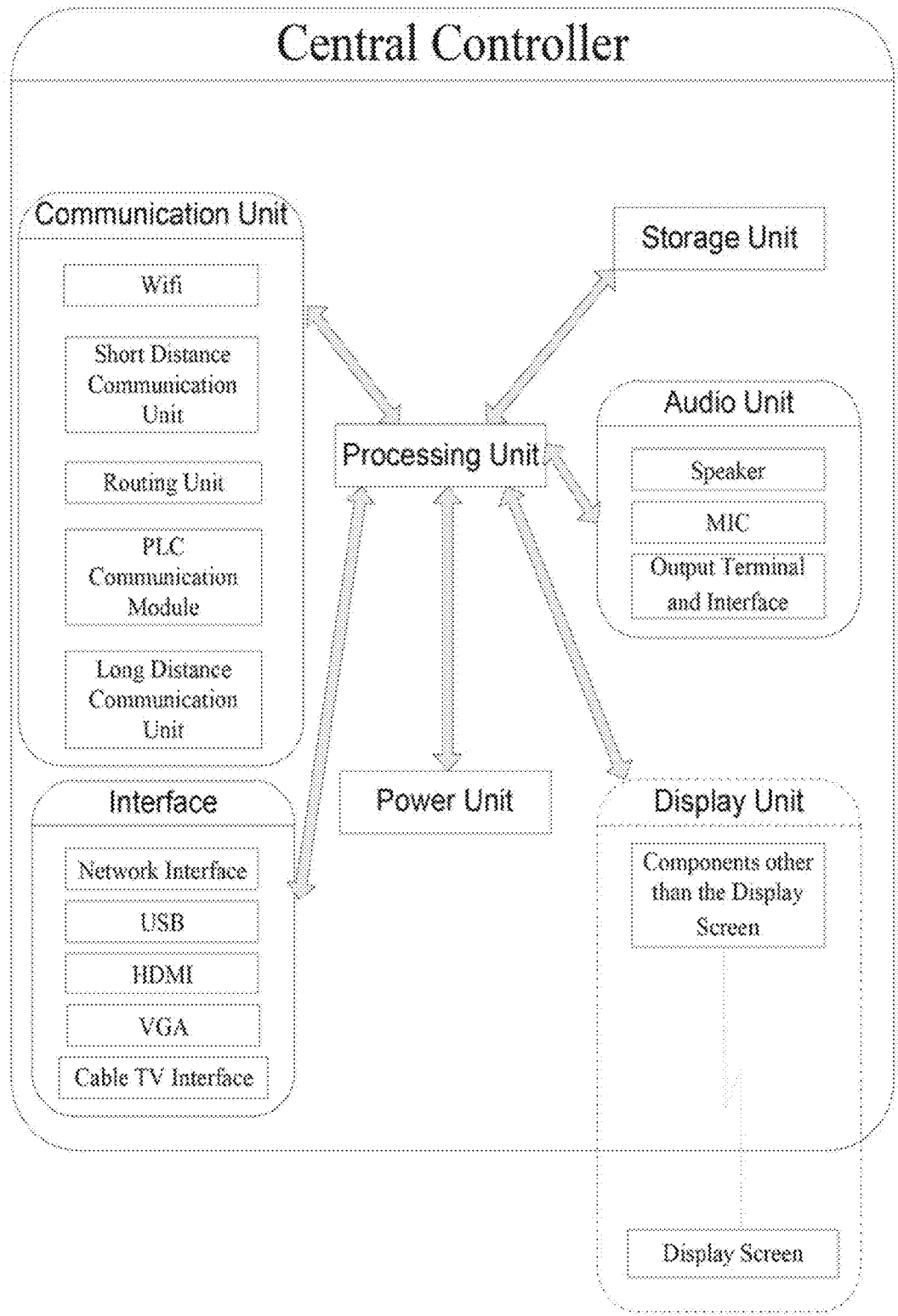
FIG. 1 is a block diagram of a housekeeper.

As shown in FIG. 1, The housekeeper hardware comprises the following units: a processing unit, a storage unit, a communication unit and a power supply unit.

The communication unit of the housekeeper may select WiFi module. In order to interconnect with smart home product with different short-distance wireless communication technology, the communication unit may comprise one or several of ZigBee, Bluetooth, Z-work, Ethernet module, and one or several of long-distance communication modules such as 4G; in addition, routing functions may be included into the housekeeper. As long as router module is added, router may be omitted and the housekeeper is used as common router. The smart home scheme is more concise. The communication unit, storage unit and power management unit are connected with the processing unit. As a preferred method, some or most of the processing unit, communication unit and power management unit may be integrated in a single Soc to effectively reduce cost, volume and power consumption, improve convenience for development and improve performance. The storage unit may be DDR3 SDRAM, FLASH and high-speed SATA hard disk with high cost performance ratio and large capacity. There are rich interfaces for the housekeeper, including one or several of USB, VGA, HDMI, RJ45 and cable TV interfaces.

The housekeeper software is of an open modular construction, falls into system software (including database) and application software. The application software further falls into all kinds of functional software (include AI software) and product monitoring software (with artificial intelligence functions). As a preferred method, the system software can be embedded real-time operating system, database may be embedded database, and functional software includes much common software, such as browser and video-audio player and artificial intelligence software (include voice processing software).

Voice is the most convenient and fastest monitoring method under most conditions. The users and housekeeper mainly interact by voice and the touch screen interaction is supplemented. As a preferred method, voice software may be current mature commercial software and calling interface is made. The housekeeper calls the audio module from artificial intelligence module to process the voice information, in addition, the housekeeper calls monitoring software or database software or system functional software (including other smart modules) according to the processing results of audio module. Under mode of screen interaction, users can directly run the monitoring software or database software or system functional software with the touch screen.

II. Servant/Servant Girl

Figure 2:
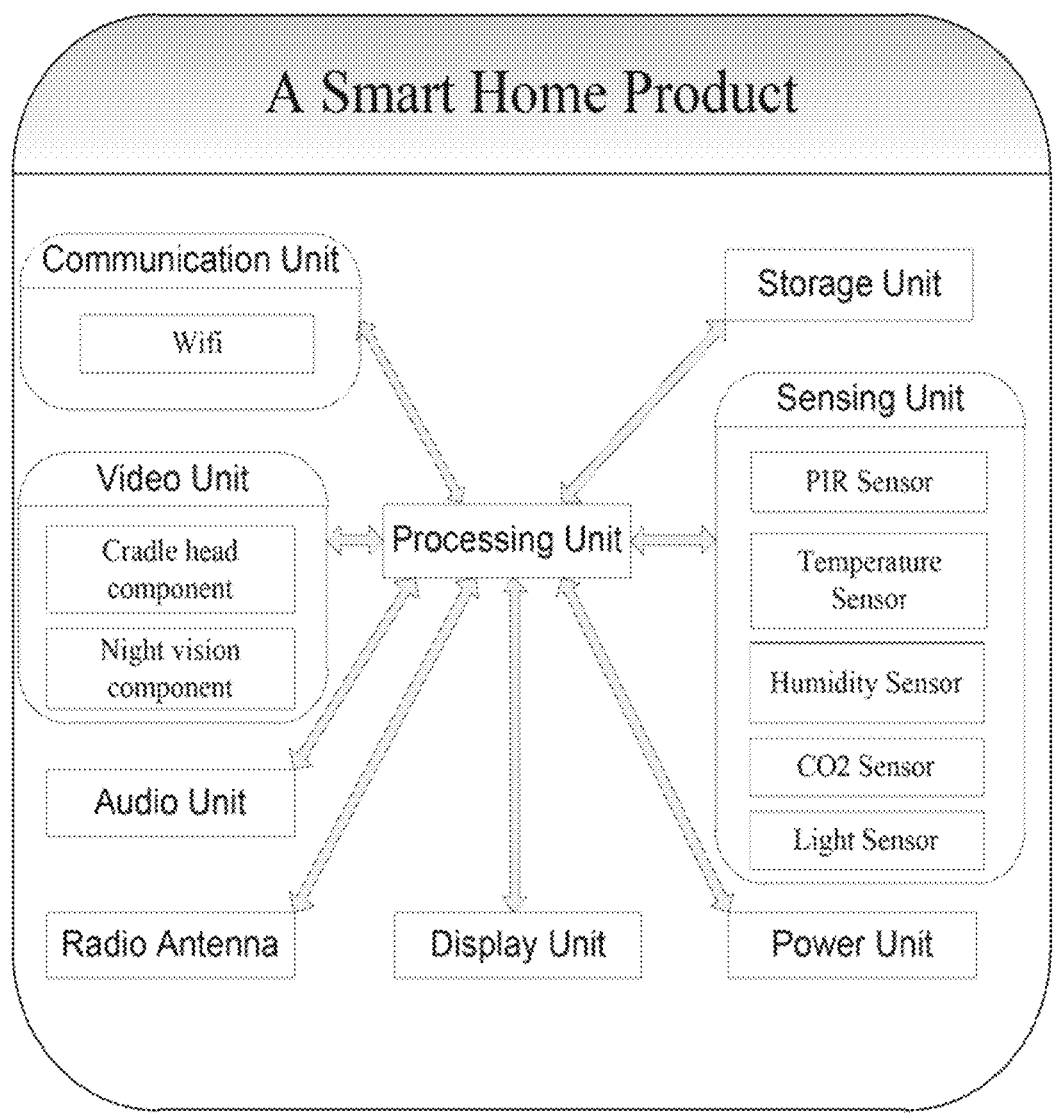
FIG. 2 is a block diagram of a servant/servant girl.

As shown in FIG. 2, servant/servant girl comprises a processing unit, a storage unit, a communication unit, an audio unit (including microphone and loudspeaker) and a power supply unit, and may also comprise a video unit, a sensor unit and a display unit, wherein all units are connected with the processing unit. As a preferred method, some or most of the processing unit, video unit, audio unit (except microphone and loudspeaker), communication unit, display unit and power management unit can be integrated into a single Soc to effectively reduce cost, volume and power consumption, improve convenience in development and improve the performance. The communication unit may select WiFi module and/or Ethernet module. With the Ethernet module, some people's worry about radiation may be eliminated; video unit selects high-pixel CMOS camera to provide high-definition video and infrared LED light and achieve clear night vision. Pan-and-tilt function is provided to detect wider range. The storage unit can be LPDDR3 SDRAM and FLASH. Sensor unit may be one or several of digital PIR sensor, temperature sensor, carbon dioxide sensor, light sensor and humidity sensor.

III. Smart Home System

Figure 3:
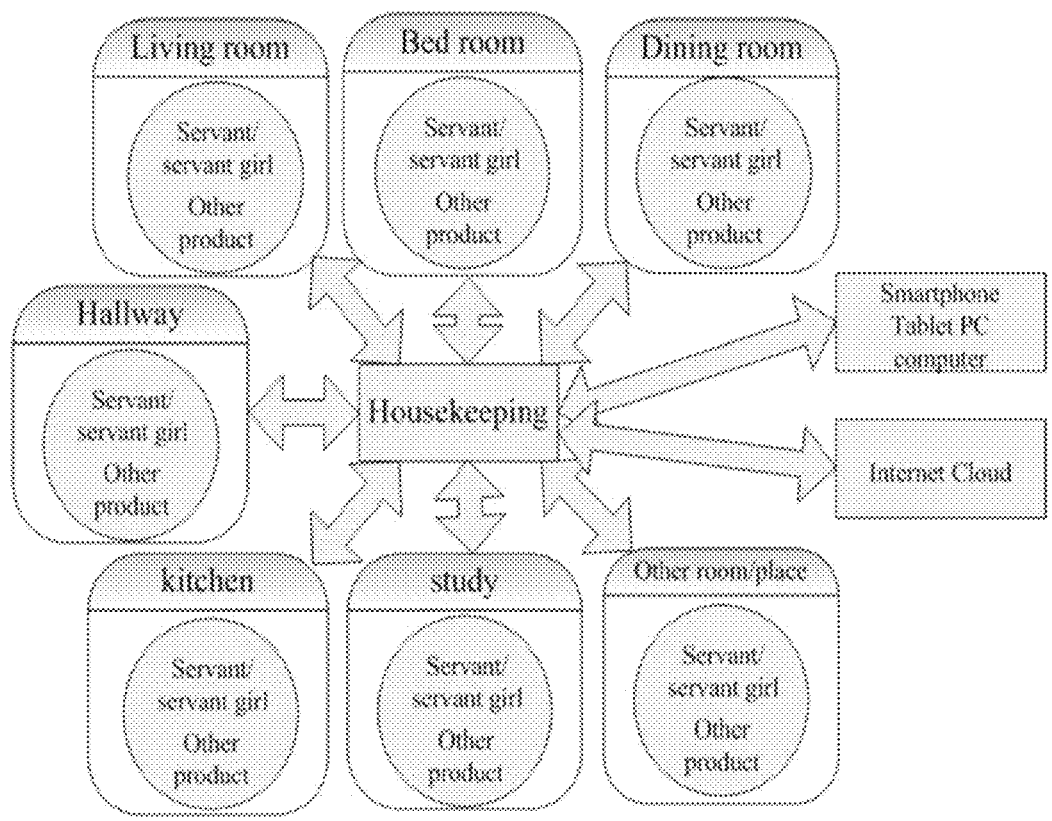
FIG. 3 is a system diagram of a smart home system.

As shown in FIG. 3, the system is composed of a housekeeper, servant/servant girl and all home products including various physical smart and non-smart products, outdoor products, such as vehicle and garden products. All home products communicate with the housekeeper in wireless or wired way, servant/servant girl can communicate each other. In respect of all home products, the housekeeper is the monitor to collect or receive their information and control their running according to the preset logics or the logics formed by addition, deletion or changing of the original logics by users; the housekeeper is the artificial intelligence server and cerebral nerve center for servant/servant girl and local or remote terminal; servant/servant girl and local and remote terminal are five sense organs and/or client (may be functional component). The housekeeper receives the service request from servant/servant girl and local or remote terminal and returns the processing results. The housekeeper can also actively contact with them to send or collect various data; the housekeeper may set the authorization of all servant/servant girls.

The smart home system classifies all products by different rooms (or positions) of the products and different categories of the products, and runs and controls products using a combination of a product name, a category of the product, and information of the room or location where the home product is located. For example, the products are categorized into lighting products, air conditioning products, security products and firefighting products. Each category includes corresponding products, for example, the category of air conditioning products may include air conditioners, humidifiers and the like.

Figure 4:
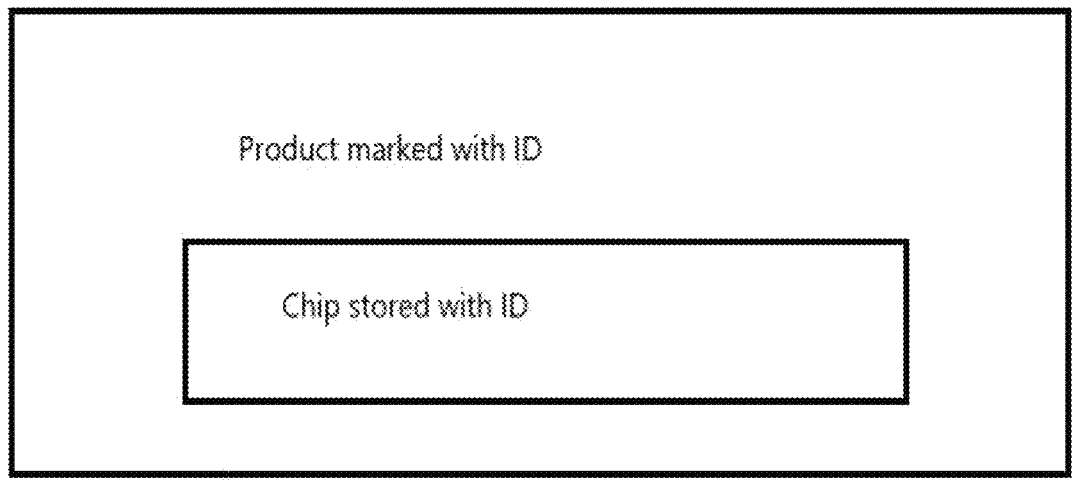
FIG. 4 is a block diagram of a home product.

As a preferred method, the housekeeper manufacturer and all partners for home products can set a unique ID in standard format for all home products and store the ID in the chip or/and mark the ID on the products, as shown in FIG. 4. The ID identifies that the product is a certain type of product belonging to a certain category. For example, for an ID having four figures such as 0102, the first two figures 01 of the ID identifies that the product assigned with this ID belongs to the category of lighting facility, and the last two figures of 02 identifies that the product is a ceiling fixture. In other words, a portion of the ID may be used to identify a category and another portion of the ID may be used to identify a sub-category subordinate to the category. And the corresponding monitoring program is supplied for products under different control ways. All products may use the corresponding compatible monitoring modules in the main monitoring program of housekeeper or use its better monitoring program; if the own better program of the product is used, the interface is provided for the main monitoring program of the housekeeper to call; if a new product monitoring program is added, the housekeeper manufacturer will update its own main monitoring program. The main monitoring program of the housekeeper has an interface for the housekeeper's voice module to call. The main monitoring program and the monitoring programs of all products are pre-stored in the website server of the housekeeper manufacturer for downloading.

As a preferred method, the establishment and working way of smart home system are as below: after a product, is arranged in place and is powered on, wireless or wired signal is sent from the product to the housekeeper, or the housekeeper sends wireless or wired signals to the product. After the product and the housekeeper are connected, the connection is confirmed manually. The housekeeper will add it into the smart home system. The housekeeper will automatically save the products and ID into the system database and tell to manually enter the name of room or position where products are installed. If there are two or more identical products in a room or position, the housekeeper will automatically number the product, and then a different name needs to be given to the product after manual inputting.

All home products run independently under normal conditions, because they have own control logics or running mode. The housekeeper mainly plays a role of overall coordination to control the system that is composed of multiple independent products; under normal condition, the system runs according to the preset logics or the logics formed by addition or changing of the original logics by users. If necessary, temporary change can be made with servant/servant girl or authorized outside products. One task of the monitoring program of the housekeeper is to auto poll all products, collect product condition data, store them into database and generate a work report. It will be interrupted in case of product alarm. The monitoring program takes priority over saving the alarm message into the alarm report of the database, and records into the database the events that are self-processed after the product responds to alarm or processed after the housekeeper responds to alarm. The generated report is used for users query or housekeeper's artificial intelligence program. Another task of the monitoring program is to analyze and process the collected data, and output the relevant command to control relevant products. Control can be changed according to artificial commands from servant/servant girl. Another task of the monitoring program is to respond to the query and control processing requests from the authorized terminals, such as mobile phone and computer or to send the relevant information to the cloud after authorization.

As a preferred method, the system software and application software (including the third-party software) of the housekeeper can be automatically updated, and the updating events are recorded.

As a preferred method, servant/servant girl is arranged in the needed room or position (or arranged on other products and integrated with other products as a product), Users can contact with the housekeeper through the product in the way of voice or screen interaction anywhere and anytime; through the housekeeper calls the corresponding program for processing according to different input requests so as to achieve real-time monitor all home products and inquire the relevant information of the home products, obtain the relevant data, related services or contact with other servant/servant girl or the outside. The programs called by the housekeeper include monitoring program, database and various application programs; for example, if we want to inquire the condition of a smart product and want to adjust the working parameters of a smart product, the housekeeper can call the monitoring program and return the query result to servant/servant girl and send commands to relevant products; for example, if we want to listen to a song, the housekeeper may search audio/video database by calling database program, or search on the internet, and then transmit the wanted songs to servant/servant girl; if we want the housekeeper to provide opinions or suggestions, the artificial intelligence program of the housekeeper will analyze and process the relevant information and then show his idea. If a product needs to be monitored separately: if there is a unique smart home product in a residence, the monitoring program of the housekeeper permit servant/servant girl to monitor the product beyond the room or position that it is arranged (for example, if there is only one intelligent sweeping machine in the residence and the machine is not arranged in the same room with servant/servant girl, you just need to say: "clean rooms or clean some room", the housekeeper will send commands to the sweeping machine); if a product is arranged in two or two more rooms or positions, such as lighting or air conditioner, the defaulted control scope of servant/servant girl specified by the monitoring program of the housekeeper is the room or position arranged with servant/servant girl, the monitoring range is not limited; if the same product in other rooms or positions is controlled, please explain the name of room or position when contacting with the housekeeper (e.g.: turn on the lamp in the toilet"); if two or two more products are in the same room or position, such as lighting, servant/servant girl needs to explain the product name to be monitored when contacting with the housekeeper, e.g.: "Turn on chandeliers (or strips or spotlights)".

DETAILED DESCRIPTION OF THE INVENTION

I. Housekeeper

As shown in FIG. 1, The housekeeper hardware comprises the following units: a processing unit, a storage unit, a communication unit and a power supply unit.

The communication unit of the housekeeper may select WiFi module. In order to interconnect with smart home product with different short-distance wireless communication technology, the communication unit may comprise one or several of ZigBee, Bluetooth, Z-work, Ethernet module, and one or several of long-distance communication modules such as 4G; in addition, routing functions may be included into the housekeeper. As long as router module is added, router may be omitted and the housekeeper is used as common router. The smart home scheme is more concise. The communication unit, storage unit and power management unit are connected with the processing unit. As a preferred method, some or most of the processing unit, communication unit and power management unit are integrated in a single Soc to effectively reduce cost, volume and power consumption, improve convenience in development and improve the performance. The storage unit may be DDR3 SDRAM, FLASH and high-speed SATA hard disk with high cost performance ratio and large capacity. There are rich interfaces for the housekeeper, including one or several of USB, VGA, HDMI, RJ45 and cable TV interfaces.

The housekeeper software is of an open modular construction, falls into system software (including database) and application software. The application software can further falls into all kinds of functional software (include AI software) and product monitoring software (with artificial intelligence functions). As a preferred method, the system software can be embedded real-time operating system, database may be embedded database, and functional software includes much common software, such as browser and video-audio player and artificial intelligence software (include voice processing software).

Voice is the most convenient and fastest monitoring method under most conditions. The users and housekeeper mainly interact by voice and the touch screen interaction is supplemented. As a preferred method, voice software may be current mature commercial software and calling interface is made. The housekeeper calls the audio module from artificial intelligence module to process the voice information, in addition, the housekeeper calls monitoring software or database software or system functional software (including other smart modules) according to the processing results of audio module. Under mode of screen interaction, users can directly run the monitoring software or database software or system functional software with the touch screen.

II. Servant/Servant Girl

As shown in FIG. 2, servant/servant girl comprises a processing unit, a storage unit, a communication unit, an audio unit (including microphone and loudspeaker) and a power supply unit, and may also comprise a video unit, a sensor unit and a display unit, wherein all units are connected with the processing unit. As a preferred method, some or most of the processing unit, video unit, audio unit (except microphone and loudspeaker), communication unit, display unit and power management unit can be integrated into a single Soc to effectively reduce cost, volume and power consumption, improve convenience for development and improve the performance. The communication unit may select WiFi module and/or Ethernet module. With the Ethernet module, some people's worry about radiation may be eliminated; video unit selects high-pixel CMOS camera to provide high-definition video and infrared LED light and achieve clear night vision. Pan-and-tilt function is provided to detect wider range. The storage unit can be LPDDR3 SDRAM and FLASH. Sensor unit may be one or several of digital PIR sensor, temperature sensor, carbon dioxide sensor, light sensor and humidity sensor.

III. Smart Home System

As shown in FIG. 3, the system is composed of a housekeeper, servant/servant girl and all home products including various physical smart and non-smart products, outdoor products, such as vehicle and garden products. All home products communicate with the housekeeper in wireless or wired way, servant/servant girl can communicate each other. In respect of all home products, the housekeeper is the monitor to collect or receive their information and control their running according to the preset logics or the logics formed by addition, deletion or changing of the original logics by users; the housekeeper is the artificial intelligence server and cerebral nerve center for servant/servant girl and local or remote terminal; servant/servant girl and local and remote terminal are five sense organs and/or client (may be functional component). The housekeeper receives the service request from servant/servant girl and local or remote terminal and returns the processing results. The housekeeper can also actively contact with them to send or collect various data; the housekeeper may set the authorization of all servant/servant girls.

The smart home system classifies all products by different rooms (or positions) of the products and different categories of the products, and runs and controls products using a combination of a product name, a category of the product, and information of the room or location where the home product is located. For example, the products are categorized into lighting products, air conditioning products, security products and firefighting products. Each category includes corresponding products, for example, the category of air conditioning products may include air conditioners, humidifiers and the like.

As an implementing method, the housekeeper manufacturer and all partners for home products can set a unique ID in standard format for all home products and store the ID in the chip or/and mark the ID on the products. The ID shows that the product is a certain type of product belonging to a certain category, and the corresponding monitoring program is supplied for products under different control ways. All products may use the corresponding compatible monitoring modules in the main monitoring program of housekeeper or use its better monitoring program; if the own better program of the product is used, the interface is provided for the main monitoring program of the housekeeper to call; if a new product monitoring program is added, the housekeeper manufacturer will update its own main monitoring program. The main monitoring program of the housekeeper has an interface for the housekeeper's voice module to call. The main monitoring program and the monitoring programs of all products are pre-stored in the website server of the housekeeper manufacturer for downloading.

As an implementing method, the establishment and working way of smart home system are as below: after a product, is arranged in place and is powered on, wireless or wired signal is sent from the product to the housekeeper, or the housekeeper sends wireless or wired signals to the product. After the product and the housekeeper are connected, the connection is confirmed manually. The housekeeper will automatically save the products and ID into the system database and tell to manually enter the name of room or position where products are installed. If there are two or more identical products in a room or position, the housekeeper will automatically number the product, and then a different name needs to be given to the product after manual inputting.

All home products run independently under normal conditions, because they have own control logics or running mode. The housekeeper mainly plays a role of overall coordination to control the system that is composed of multiple independent products; under normal condition, the system runs according to the preset logics or the logics formed by addition or changing of the original logics by users. If necessary, temporary change can be made with servant/servant girl or authorized outside products. One task of the monitoring program of the housekeeper is to auto poll all products, collect product condition data, store them into database and generate a work report. It will be interrupted in case of product alarm. The monitoring program takes priority over saving the alarm message into the alarm report of the database, and records into the database the events that are self-processed after the product responds to alarm or processed after the housekeeper responds to alarm. The generated report is used for users query or housekeeper's artificial intelligence program. Another task of the monitoring program is to analyze and process the collected data, and output the relevant command to control relevant products. Control can be changed according to artificial commands from servant/servant girl. Another task of the monitoring program is to respond to the query and control processing requests from the authorized terminals, such as mobile phone and computer or to send the relevant information to the cloud after authorization.

As an implementing method, the system software and application software (including the third-party software) of the housekeeper can be automatically updated, and the updating events are recorded.

As an implementing method, servant/servant girl is arranged in the needed room or position (or arranged on other products and integrated with other products as a product), Users can contact with the housekeeper through the product in the way of voice or screen interaction anywhere and anytime; through the housekeeper calls the corresponding program for processing according to different input requests so as to achieve real-time monitor all home products and inquire the relevant information, obtain the relevant data, related services or contact with other servant/servant girl or the outside. The programs called by the housekeeper include monitoring program, database and various application programs; for example, if we want to inquire the condition of a smart product and want to adjust the working parameters of a smart product, the housekeeper can call the monitoring program and return the query result to servant/servant girl and send commands to relevant products; for example, if we want to listen to a song, the housekeeper may search audio/video database by calling database program, or search on the internet, and then transmit the wanted songs to servant/servant girl; if we want the housekeeper to provide opinions or suggestions, the artificial intelligence program of the housekeeper will analyze and process the relevant information and then show his ideal. If a product needs to be monitored separately: if there is a unique smart home product in a residence, the monitoring program of the housekeeper permit servant/servant girl to monitor the product beyond the room or position that it is arranged (for example, if there is only one intelligent sweeping machine in the residence and the machine is not arranged in the same room with servant/servant girl, you just need to say: "clean rooms or clean a room", the housekeeper will send commands to the sweeping machine); if a product is arranged in two or two more rooms or positions, such as lighting or air conditioner, the defaulted control scope of servant/servant girl for the monitoring program of the housekeeper is the room or position arranged with servant/servant girl, the monitoring range is not limited; if the same product in other rooms or positions is controlled, please explain the name of room or position when contacting with the housekeeper (e.g.: turn on the lamp in the toilet"); if two or two more products are in the same room or position, such as lighting, servant/servant girl needs to explain the product name to be monitored when contacting with the housekeeper, e.g.: "Turn on chandeliers (or strips or spotlights)".

In an embodiment, the central controller actively collects or receives the working status information of each home product, and automatically manages and controls each home product after analyzing and processing the working status information.

What is claimed is:

1. A smart home system, comprising:
a central controller arranged in a room of a house; and
one or more human-machine interaction devices arranged in one or more rooms of the house;
wherein the central controller is connectable to one or more smart home appliances via a wireless or wired connection; and the human-machine interaction devices are configured to communicate with the central controller;
wherein the human-machine interaction devices are configured to:
obtain, from a user, an operation command via a voice control, wherein the operation command includes a control instruction or a query instruction; and
send, to the central controller, the operation command;
wherein the central controller is configured to:
store information of the one or more smart home appliances, wherein the information of the one or more smart home appliances includes names and types thereof and information of rooms where the one or more smart home appliances are respectively located;
store information of the one or more human-machine interaction devices, wherein the information of the one or more human-machine interaction devices includes information of rooms where the one or more human-machine interaction devices are respectively located;
receive, from the human-machine interaction devices, the operation command;
based on a preset program in the central controller and the stored information, automatically perform the following steps for each type of the one or more smart home appliances:
S1: determining whether there is only one single smart home appliance of this type, and if it is determined that there is only one single smart home appliance of this type, controlling or monitoring this single smart home appliance of this type in accordance with the received operation command;

S2: if it is determined that there is not only one single smart home appliance of this type, then determining whether there is only one smart home appliance of this type located in the room where one of the human-machine interaction devices that sends the operation command is placed, and if it is determined that there is only one smart home appliance of this type located in the room where one of the human-machine interaction devices that sends the operation command is placed, controlling or monitoring this smart home appliance of this type in this room in accordance with the received operation command;

S3: if it is determined that there is not only one smart home appliance of this type located in the room where one of the human-machine interaction devices that sends the operation command is placed, acquiring names of the smart home appliances of this type located in this room from the stored information, and controlling or monitoring one of the smart home appliances of this type in this room that has a matching name in accordance with the received operation command.

2. The smart home system of claim 1, wherein the central controller comprises WiFi, and one or more selected from ZigBee, Bluetooth and Z-Wave.

3. The smart home system of claim 1, wherein the central controller comprises one or more of universal serial bus (USB) interface, high-definition multimedia interface (HDMI), video graphics array (VGA) interface and cable television interface.

4. The smart home system of claim 1, wherein the central controller comprises one or more short-distance communication modules.

5. The smart home system of claim 1, wherein the central controller comprises one or more long-distance communication modules.

6. The smart home system of claim 1, wherein the central controller comprises one or more routing units.

7. The smart home system of claim 1, wherein the central controller comprises a display.

8. The smart home system of claim 1, wherein one or more of the human-machine interaction devices each comprise WiFi.

9. The smart home system of claim 1, wherein one or more of the human-machine interaction devices each comprise a video unit equipped with a cradle head and night vision.

10. The smart home system of claim 1, wherein one or more of the human-machine interaction devices each comprise a passive infrared (PIR) sensor, a temperature sensor, a humidity sensor, a carbon dioxide ($CO_2$) sensor, or a light sensor.

11. The smart home system of claim 1, wherein one or more of the human-machine interaction devices each comprise a display.

12. The smart home system of claim 1, wherein one or more of the human-machine interaction devices each comprise a radio antenna.

13. The smart home system of claim 1, wherein the central controller is further configured to communicate with a local or remote terminal or cloud.

14. The smart home system of claim 1, wherein the information of the smart home appliances includes a standard format identification (ID) number for each of the smart home appliances.

* * * * *